UNITED STATES PATENT OFFICE.

WILLIAM ARTHUR CALDECOTT, OF JOHANNESBURG, SOUTH AFRICAN REPUBLIC.

METHOD OF EXTRACTING GOLD FROM CYANID SOLUTIONS CONTAINING THE PRECIOUS METALS.

SPECIFICATION forming part of Letters Patent No. 654,437, dated July 24, 1900.

Application filed January 31, 1898. Serial No. 668,666. (No specimens.)

*To all whom it may concern:*

Be it known that I, WILLIAM ARTHUR CALDECOTT, analytical chemist, a resident of Johannesburg, Transvaal, South African Republic, have invented certain new and useful Improvements in Methods of Extracting Gold from Solutions Containing the Precious Metals, of which the following is a specification.

This invention relates to methods of extracting gold from cyanid solutions containing the precious metals; and the object I have in view is to improve and cheapen the methods at present known.

I pass the gold-bearing solution of potassium cyanid of any strength through launders or boxes containing a mechanical mixture of zinc shavings and lead shavings and allow the gold to deposit on the mixture of metals. The gold is then obtained in the usual way.

I am aware that alloys of metals have been used; but what I claim is the mechanical mixture of these particular metals hereinbefore described.

The advantages of a mechanical mixture of lead shavings and zinc shavings over old forms of lead-zinc couples above described is as follows: In precipitating the gold from gold-bearing cyanid solution obtained in the treatment of auriferous battery-slimes these solutions frequently carry finely-divided solid matter in suspension. This suspended solid matter becomes deposited all over the surface of the precipitating agent, forming a slimy coating, and thereby protecting it to a great extent from actual contact with the solution, thus gradually lessening its efficiency. In the case of lead-zinc alloys or of a lead-zinc couple formed by lead deposited on zinc fresh solution is not allowed to pass between the zinc and lead particles after the formation of this coating and to thereby become subjected to the action of the galvanic current, which causes the precipitation of the gold. In the case, however, of a mechanical mixture of lead and zinc shavings actual experience on a large scale has shown that although the zinc shavings and lead shavings become coated in the manner described, yet there being an appreciable interval between the shavings through which a stream of solution is constantly passing the galvanic current still acts, and passing from the zinc to the lead, causes the precipitation of the gold. In other words, the mechanical mixture of zinc shavings and lead shavings retains its efficiency for the reasons above described longer than other lead-zinc couples in precipitating the gold from the turbid cyanid solutions met with in certain operations of gold extraction, particularly in the treatment of slimes.

Preferably the mixture of lead and zinc shavings is formed as follows: Alternate layers of zinc, lead, and paper are made up on a mandrel, forming a compact cylinder, and from this lead and zinc shavings are produced simultaneously as one shaving, the paper giving a division-line between the alternate layers of lead and zinc. The lead and zinc thus form an electric couple. Neither lead nor zinc by itself will decompose water and precipitate gold from a solution in which there is no cyanid, but a mixture of zinc and lead shavings will, and I consider such use of the mixture of shavings within my invention.

Having described my invention, what I claim as new, and desire to secure by Letters Patent, is—

Means for extracting gold from cyanid solutions in depositing-cells, consisting in a mechanical mixture of zinc shavings and lead shavings.

Signed at Johannesburg, Transvaal, South African Republic, this 3d day of December, 1897.

WILLIAM ARTHUR CALDECOTT.

Witnesses:
GEO. MCDOUGALL,
WM. WISCOM.